(12) United States Patent
Valderrama

(10) Patent No.: US 6,209,269 B1
(45) Date of Patent: Apr. 3, 2001

(54) ASSEMBLY SYSTEM FOR THERMOACOUSTIC WINDOWS

(76) Inventor: Mario Valderrama, Av. 62 No. 126A-32 Apt. 211, Bogota (CO)

( * ) Notice: Subject to any disclaimer, the term of this patent is extended or adjusted under 35 U.S.C. 154(b) by 0 days.

(21) Appl. No.: 09/306,492

(22) Filed: May 6, 1999

(51) Int. Cl.[7] .................................. E06B 7/12; E06B 3/96
(52) U.S. Cl. ........................ 52/171.3; 52/204.1; 52/204.6; 52/209; 52/656.2; 52/656.5; 52/656.9; 52/786.1
(58) Field of Search ................................. 52/2.16, 204.1, 52/209, 204.6, 171.3, 656.2, 656.5, 656.9, 786.1

(56) References Cited

U.S. PATENT DOCUMENTS

| | | |
|---|---|---|
| 3,685,239 | 8/1972 | McCurdy et al. . |
| 3,810,331 * | 5/1974 | McCurdy et al. ................. 52/172 X |
| 3,929,186 * | 12/1975 | Becker ............................... 52/172 X |
| 4,015,394 | 4/1977 | Kessler . |
| 4,074,480 | 2/1978 | Burton . |
| 4,098,035 * | 7/1978 | Bessler .............................. 52/2.16 X |
| 4,166,345 * | 9/1979 | Becker ............................... 52/172 X |
| 4,723,388 * | 2/1988 | Zieg .................................. 52/656.5 X |
| 4,791,762 | 12/1988 | Hwang . |

FOREIGN PATENT DOCUMENTS

| | | |
|---|---|---|
| 83307511 | 12/1983 | (EP) . |
| PCT/US97/21752 | 11/1997 | (WO) . |

* cited by examiner

Primary Examiner—Christopher T. Kent
(74) Attorney, Agent, or Firm—Baker & McKenzie

(57) ABSTRACT

An assembly system used to build two pane thermoacoustic windows for houses and buildings is provided. The assembly system uses a set of profiles and joints and a permanently installed valve to assemble the window frame without a fusion welding machine. The system creates an airtight chamber directly on the frame. The valve allows the assembler to evacuate the air in the airtight chamber to make a vacuum, or to inflow a gas. The system improves the insulating thermal and acoustic capacity of the window, and allows a supplier to sell the components to build the window, which is then assembled by snapping together profiles and joints. The system can also be applied to assembly one pane window and for other purposes.

12 Claims, 13 Drawing Sheets

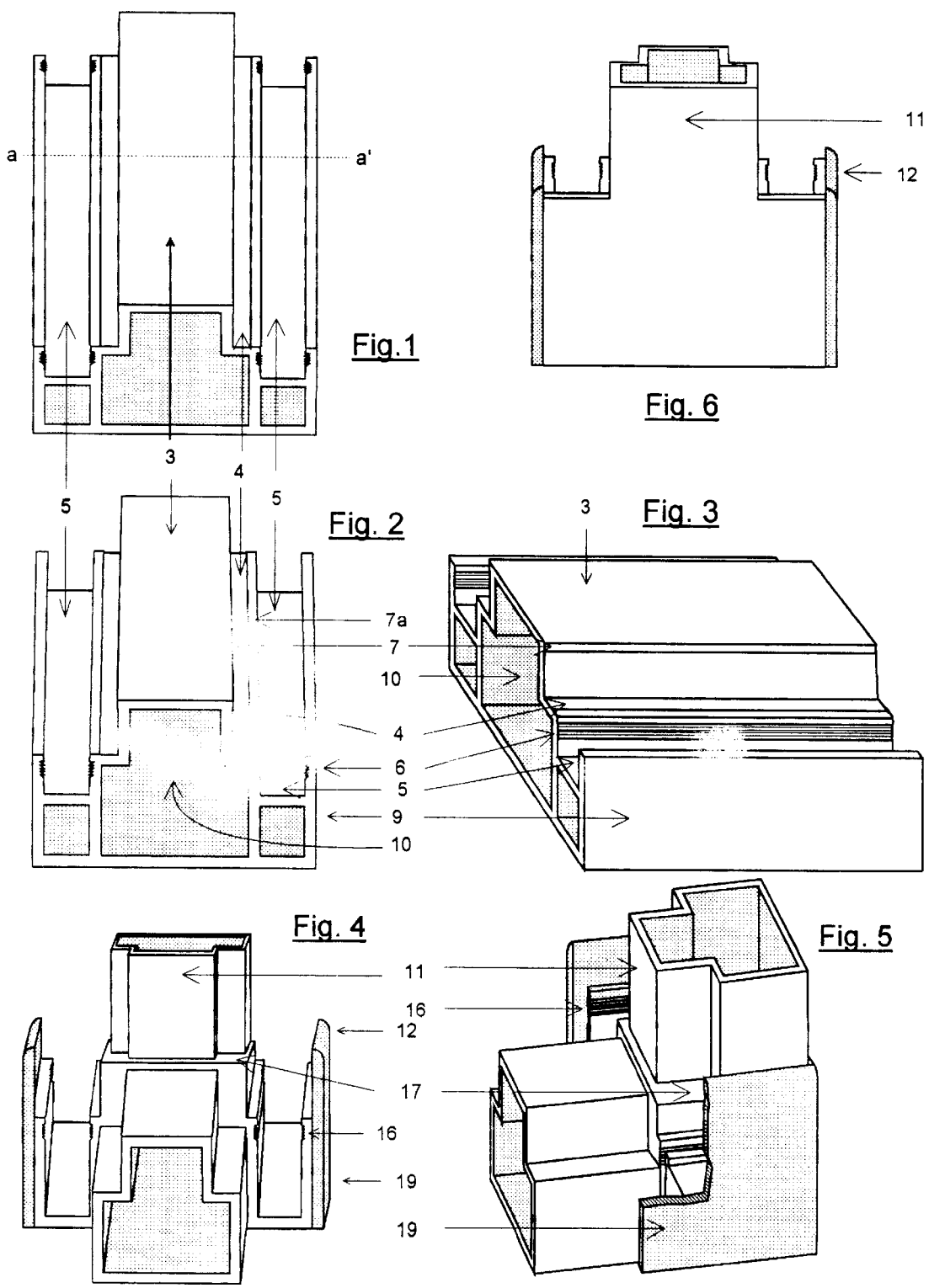

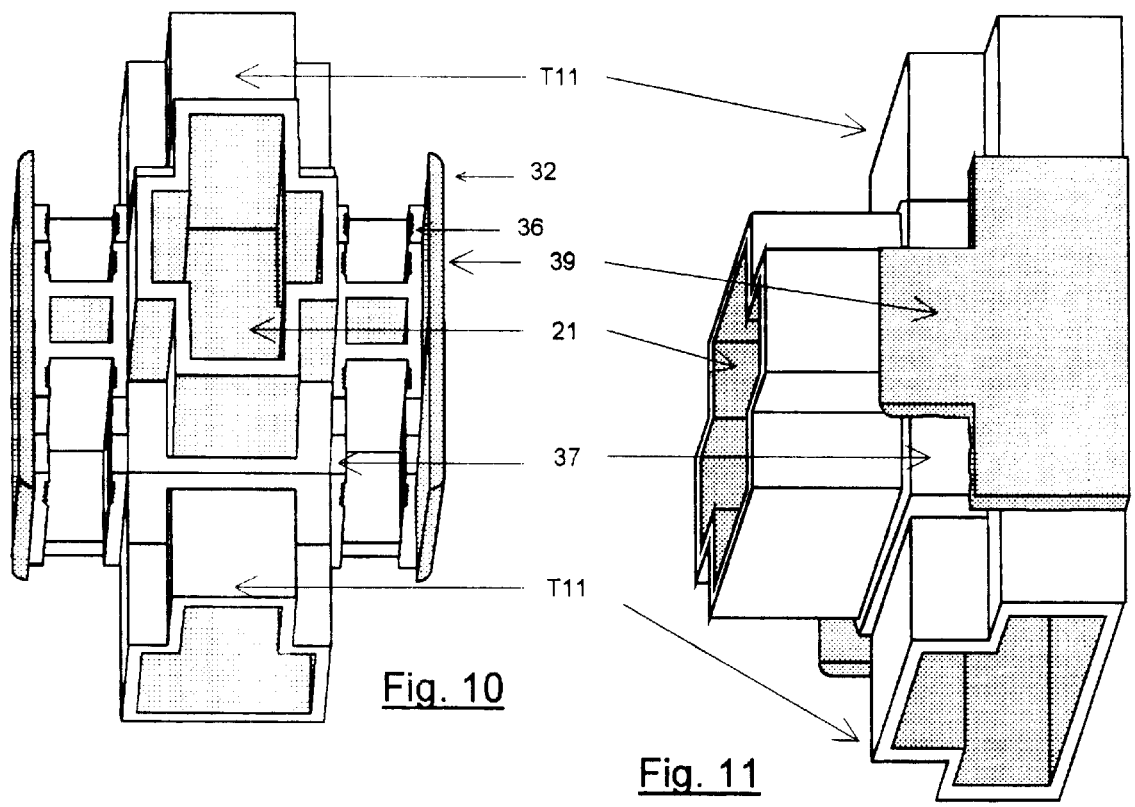
Fig. 10
Fig. 11
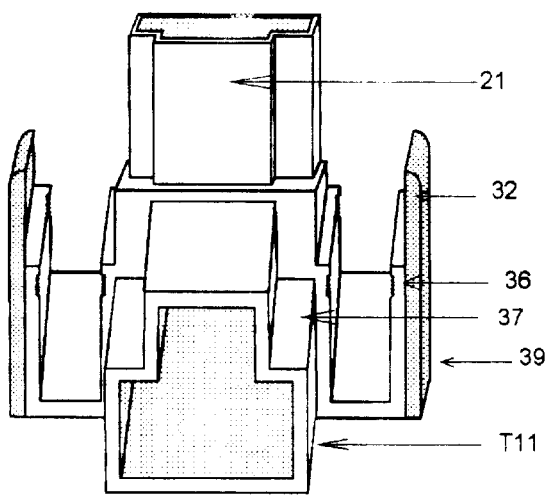
Fig. 12

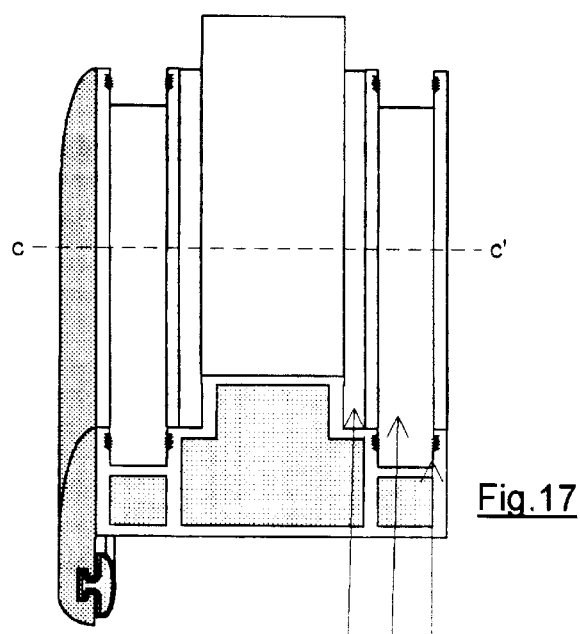
Fig. 17
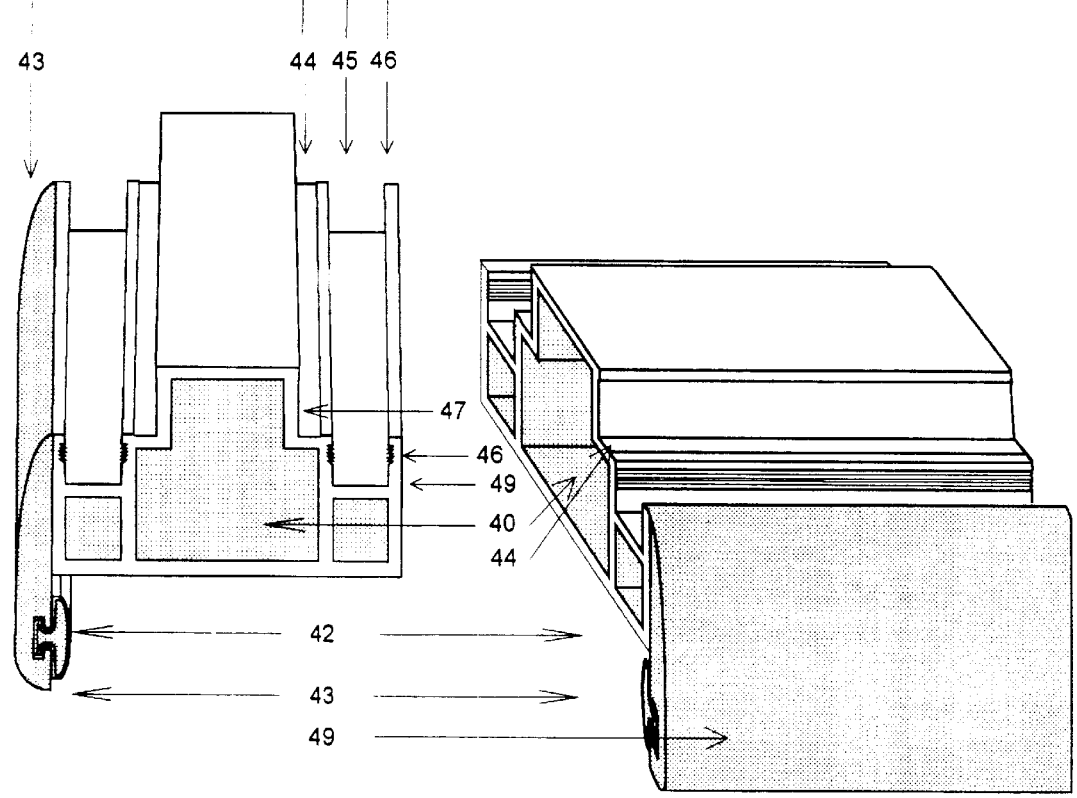
Fig. 18
Fig. 19

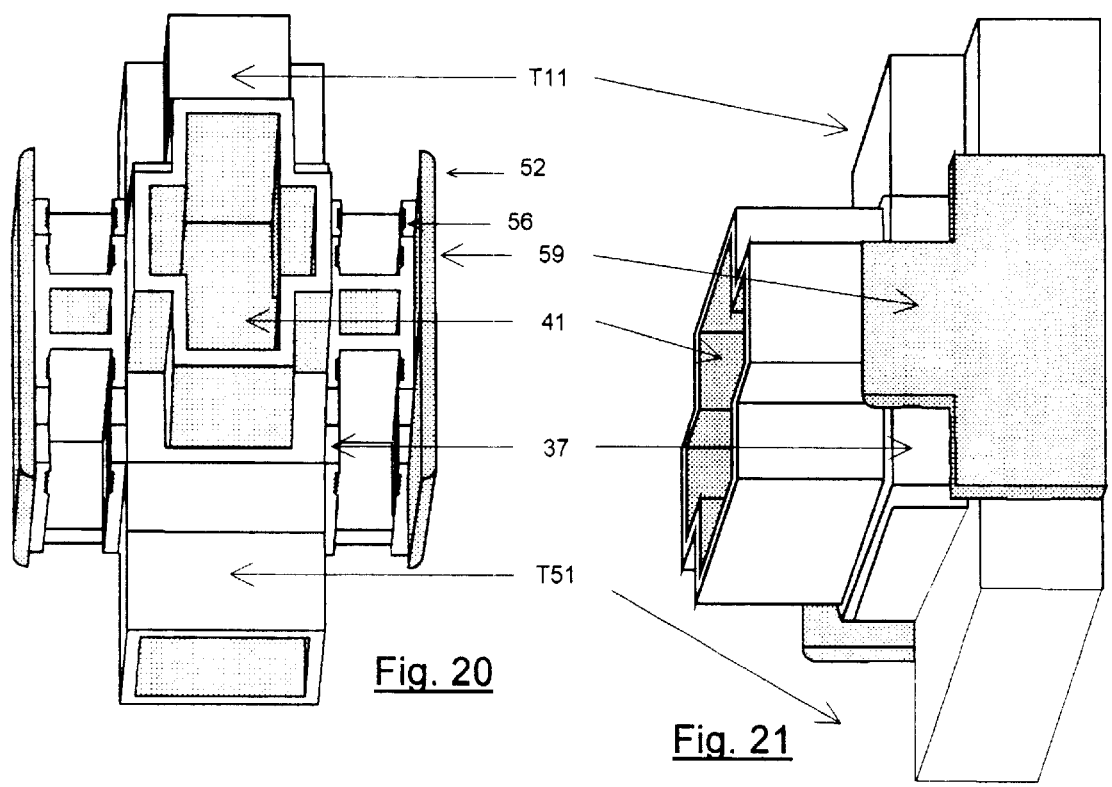
Fig. 20
Fig. 21
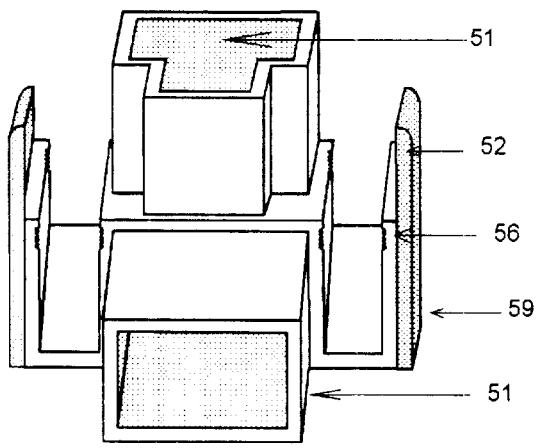
Fig. 22

Fig. 53  INDEX OF BASIC COMPONENTS
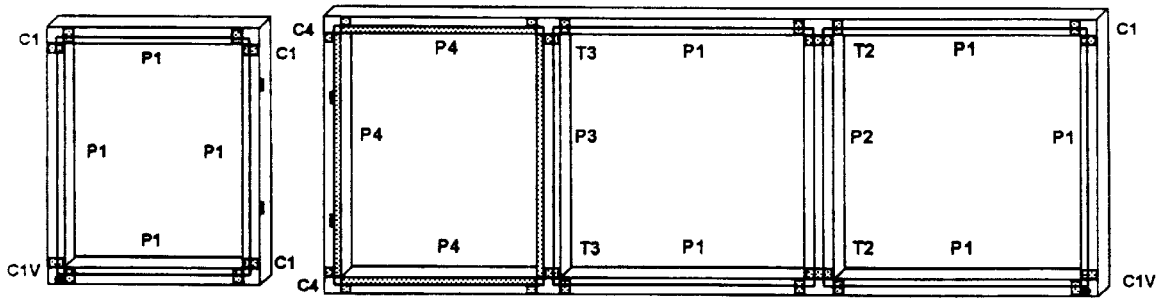
LIST OF BASIC COMPONENTS
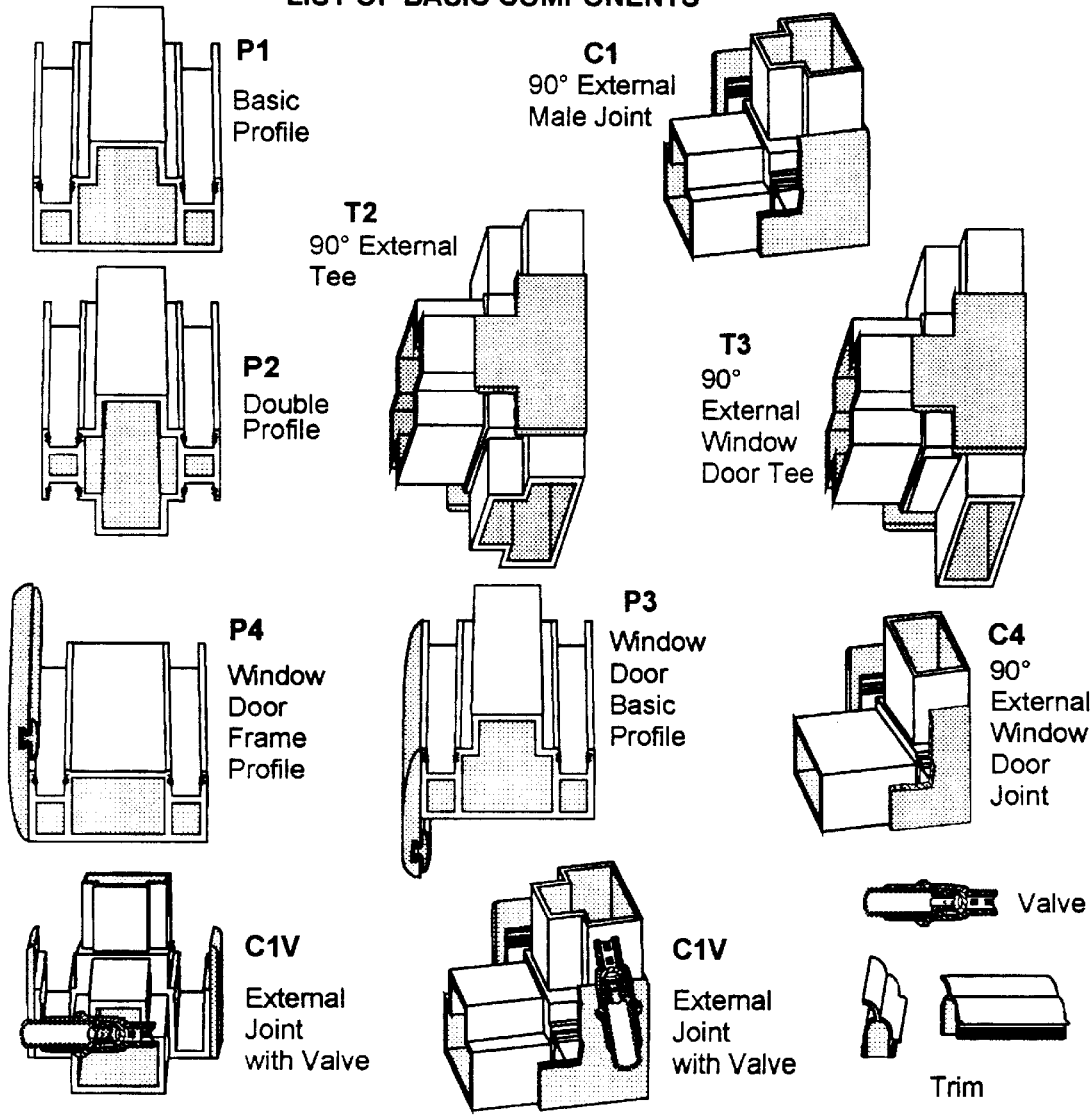
P1 Basic Profile
P2 Double Profile
P4 Window Door Frame Profile
C1V External Joint with Valve
T2 90° External Tee
T3 90° External Window Door Tee
P3 Window Door Basic Profile
C1V External Joint with Valve
C1 90° External Male Joint
C4 90° External Window Door Joint
Valve
Trim

Fig. 55

| CURRENT SYSTEM: Profiles and fusion welding | NEW SYSTEM: Snapping Profiles and Joints+Vacuum |
|---|---|
| I. Research and Development | I. Research and Development |
| 1. Design of Profiles | 1. Design of profiles and joints |
| a. Airtight chamber accommodating space | a. Coincide joints and profiles in form and dimensions |
| b. Gaskets, rubber-like seals | b. Adherence surface, glass pane separation |
|  | c. Glass pane critical area |
| 2. Profiles support the airtight chamber weight | 2. Profiles endurance to atmospheric pressure |
| 3. Separated production of airtight chamber | 3. Design and location of vacuum valve |
| a. Sealing of glass panes – glazing | 4. Safety against collapsing by atmospheric pressure |
| b. Desiccating matrix | 5. Performance of glues: in joints and in glass pane and frame |
| c. Let air in or inflow argon gas or similar |  |
| II. Commercial Production | II. Commercial Production |
| 1. Final design and specifications of profiles | 1. Final designs and specifications. Profiles, joints, valve |
| 2. Tooling of molds for profiles | 2. Tooling of molds for: profiles, joints, valve |
| 3. Profile Extrusion | 3. Extrusion of profiles |
|  | 4. Injection of joints |
|  | 5. Injection of valve |
| III. Distribution of Components | III. Distribution of Components |
| 1. To window manufacturer, having fusion welding machine | 1. To window manufacturer having fusion welding machine |
|  | 2. To window manufacturer no having fusion welding machine |
| 2. To final users: | 3. To final users: |
| a. As ready-to-install windows | a. As ready-to-install windows |
|  | b. As parts to be assembled by do-it-yourself user |
| IV. Assembly and installation | IV. Assembly and installation |
| 1. Type of window. Measurements | 1. Type of window. Measurements |
| 2. 45° cutting of profiles at shop | 2. 45° or 90° cutting of profiles, at shop or at final site |
| 3. Assemble frame with fusion welding machine at shop | 3. Assemble frame by snapping-on profiles and joints at site |
| 4. Get rid of excess material from | 4. Use joint with valve or install valve in profile. Add filter |
| 5. Insert reinforcements in bottom profile. Optional | 5. Optional: conceal desiccating material inside profile |
| 6. Nest airtight chamber onto frame | 6. Make airtight chamber binding glass panes on frame |
| 7. Fix gaskets between frame and airtight chamber | 7. Make vacuum: binds glass panes to frame. Structural strength |
| 8. Weight of airtight chamber rests on bottom profile | 8. Glass panes 'hang' from frame, not only on bottom profile |
|  | 9. Verify vacuum. Optional: fill in with argon gas or similar |
| 9. Snap in external trim | 10. Snap in external trim |
| 10. Secure window in wall opening | 11. Secure window in wall opening |
| 11. Snap in internal trim | 12. Snap in internal trim |

ASSEMBLY SYSTEM FOR THERMOACOUSTIC WINDOWS

BACKGROUND OF THE INVENTION

1. Field of the Invention

The invention is generally related to the manufacture of windows and other building partitions, and more specifically to multiple pane thermoacoustic windows and other building partitions, such as doors, walls and ceilings. The invention is an improvement of current systems for producing two pane thermoacoustic windows and one pane windows for houses and buildings, especially systems that use a plastic material to make the profiles and the frame. The new system can be employed in other similar products like partitions, doors, and ceilings.

2. Description of the Related Art

The insulating effect of thermoacoustic windows currently on the market originates mainly from the airtight chamber between the two panes. Acoustic insulation is achieved because when a noise is produced at the exterior of the airtight chamber between panes, the air inside the chamber vibrates less than the air outside, which reduces the sound level between the focus and the other side of the airtight chamber. Any tiny orifice that allows communication between the inside air and the outside air reduces the noise-insulating capacity of the window. For this reason, thermoacoustic windows require good sealing contact in all critical points, especially, in the unions of profiles that form the window frame, in the contact area of the glass panes with the window frame, and in the contact area between the window and the wall. Since sound does not travel in a vacuum, an airtight chamber with a vacuum inside will have better insulating capacity. In a similar way, when the two sides of the airtight chamber are exposed to different temperatures, thermal insulation is achieved because the air inside the chamber reaches a temperature between the outside and inside temperature. Here also, any tiny orifice that allows air to enter in the chamber reduces its insulating capacity.

Thermoacoustic windows having PVC framing have insulating advantages over windows having framing made of aluminum and similar materials. However, certain drawbacks in currently available systems of construction and installation of windows having PVC framing limit the use of thermoacoustic windows having PVC framing. The most advanced construction technology currently used over the world to form thermoacoustic windows having PVC framing involves the construction of a window frame by fusion welding plastic (PVC, vinyl) profiles designed to accommodate an insulating chamber which is made by glazing two glass panes separated by 20 to 25.4 millimeters. The technology uses a sealing material along the interior edge of two glass panes in order to bind the panes together. A device with desiccating material is inserted to absorb humidity and avoid condensation and fogging at low temperatures. In some cases, the air inside is replaced by an inert gas.

Although this technology achieves good contact with rubber-like seals, the insulating airtight chamber is not in tight contact with the window frame leaving tiny spaces and orifices between them. Additionally, the weight of this chamber, the largest of the whole window, rests entirely on the bottom side of the window frame. In some cases, a reinforcing metal is introduced in this profile.

It is an object of the present invention to provide an assembly system for thermoacoustic windows that renders airtight sealed unions in profiles that make the frame.

It is another object of the present invention to provide an assembly system for thermoacoustic windows that does not require a fusion-welding machine for assembling the windows.

It is still another object of the present invention to provide an assembly system for thermoacoustic windows that allows a user to make an insulating airtight chamber directly on the window frame.

SUMMARY OF THE INVENTION

The present invention provides a system to build a two glass pane thermoacoustic window that renders airtight sealed unions in profiles that make the frame, does not require a fusion-welding machine, and allows a user to make an insulating airtight chamber directly on the window frame. The system is based on a specially designed set of profiles and joints, and a valve. The frame unions are airtight sealed because the profiles and the joints are designed and manufactured to be inserted one into the other, with a precision and tolerance that forms a seal on the contact surfaces. The design additionally provides an adherence surface on the window frame which, using a binding material, seals the glass panes and frame to create an airtight chamber. With this new construction system, it is possible to achieve a sealing of unions such that the interior of the frame becomes an airtight duct. In turn, this hermetic condition makes possible to use a permanent valve to take out the air inside the frame and the airtight chamber between the glass panes.

Although the joints used to make airtight sealed unions have been used for other purposes, they are not used currently for construction of one or two glass pane windows. Furthermore, the joints have not been designed for window profiles and joints with such a purpose. The window profiles currently available in the marketplace do not include hermetic unions or designs to create an airtight chamber directly on the window frame, nor to make vacuum inside the frame at assembly or afterwards.

BRIEF DESCRIPTION OF THE DRAWINGS

These and other features, aspects, object and advantages of the present invention will become better understood upon consideration of the following detailed description, appended claims and accompanying drawings where the set of profiles, joints and the valve that make up the snap on assembly system are exemplified by the following figures:

Set of Profiles and Joints:

FIG. 1 is a top view of the basic profile (P1);

FIG. 2 is a cross-sectional view of the basic profile P1 taken along line a–a' of FIG. 1;

FIG. 3 is a side view of the basic profile P1;

FIG. 4 is top view of visible 90° male joint (C1);

FIG. 5 is a side view of the visible 90° male joint C1 of FIG. 4;

FIG. 6 is a side rear view of visible 90° male joint C1 of FIG. 4;

FIG. 10 is a top view of a 90° Tee (T2);

FIG. 11 is a side view of the 90° Tee T2 of FIG. 10;

FIG. 12 is another side view of the 90° Tee T2 of FIG. 10;

FIG. 17 is a top view of a window door basic profile (P3);

FIG. 18 is a cross-sectional view of the window door basic profile P3 taken along line c–c' of FIG. 17;

FIG. 19 is a side view of the window door basic profile P3 of FIG. 17;

FIG. 20 is a top view of a 90° Tee for a window door basic profile (T3)

FIG. 21 is a side view of the 90° Tee for a window door basic profile T3 of FIG. 20;

FIG. 22 is a front view of the 90° Tee for a window door basic profile T3 of FIG. 20;

Figure 28:
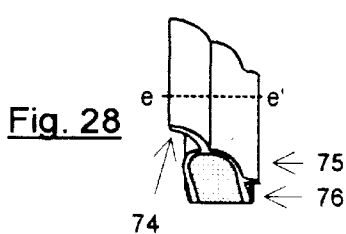
Figure 31:
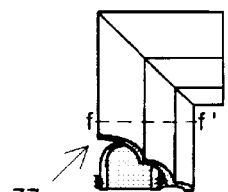
Figures 29, 30:
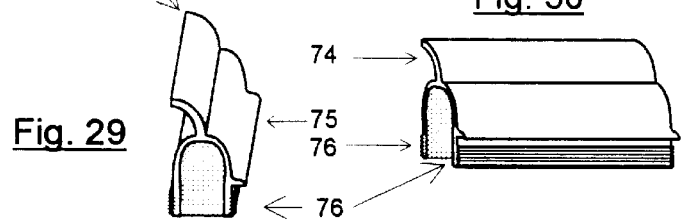
Figure 32:
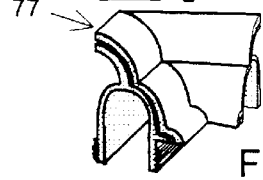
Figure 33:
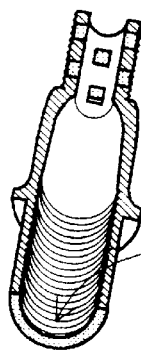
Figure 34:
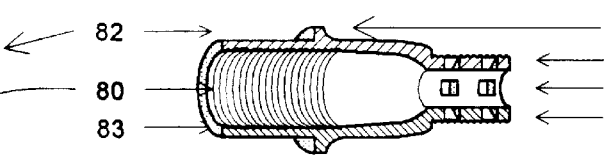
Figure 35:
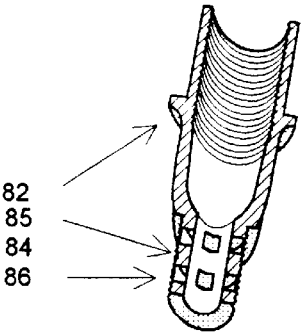
Figure 36:
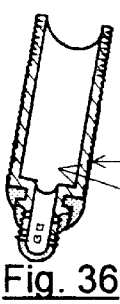
Figure 37:
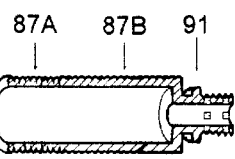
Figure 38:
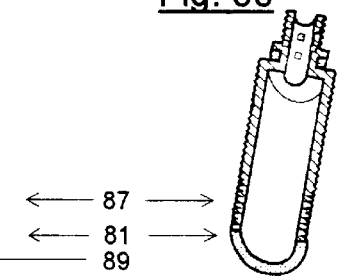
Figure 39:
Figure 40:
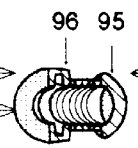
Figure 41:
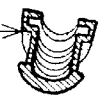
Figure 42:
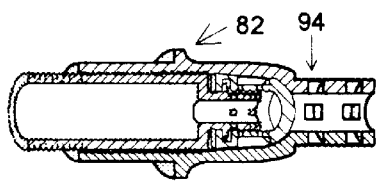
Figure 43:
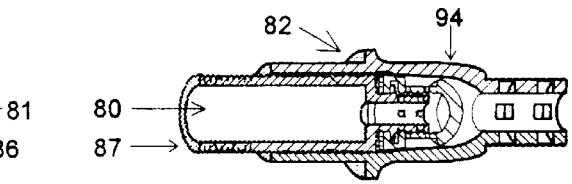
Figure 44:
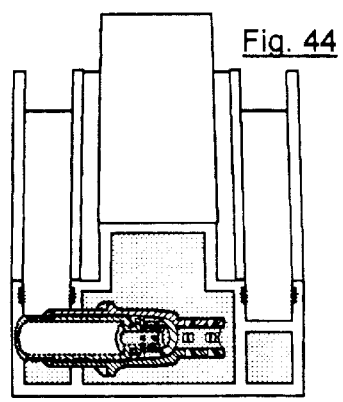
Figure 45:
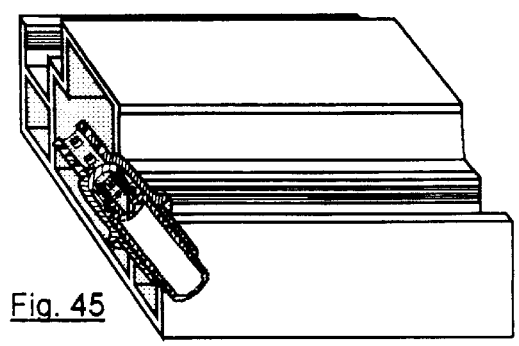
Figure 46:
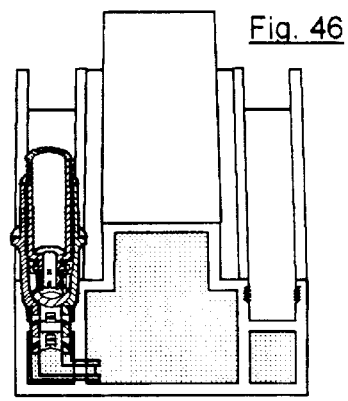
Figure 47:
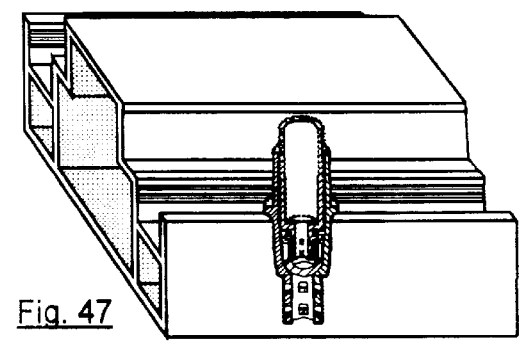
Figure 48:
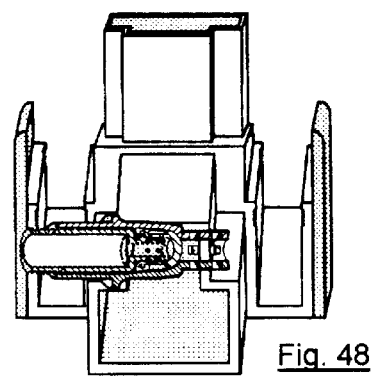
Figure 49:
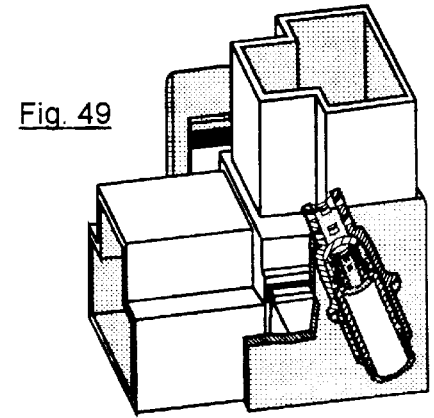
Figure 50:
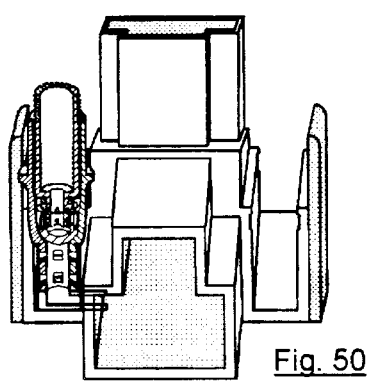
Figure 51:
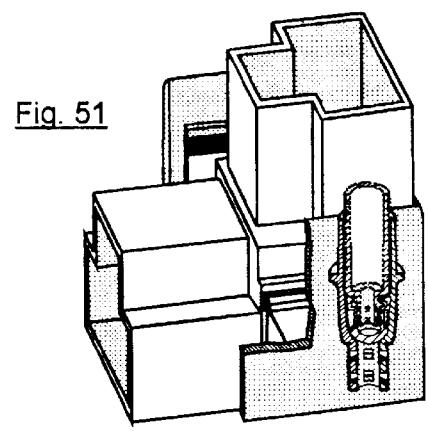
Figure 52:
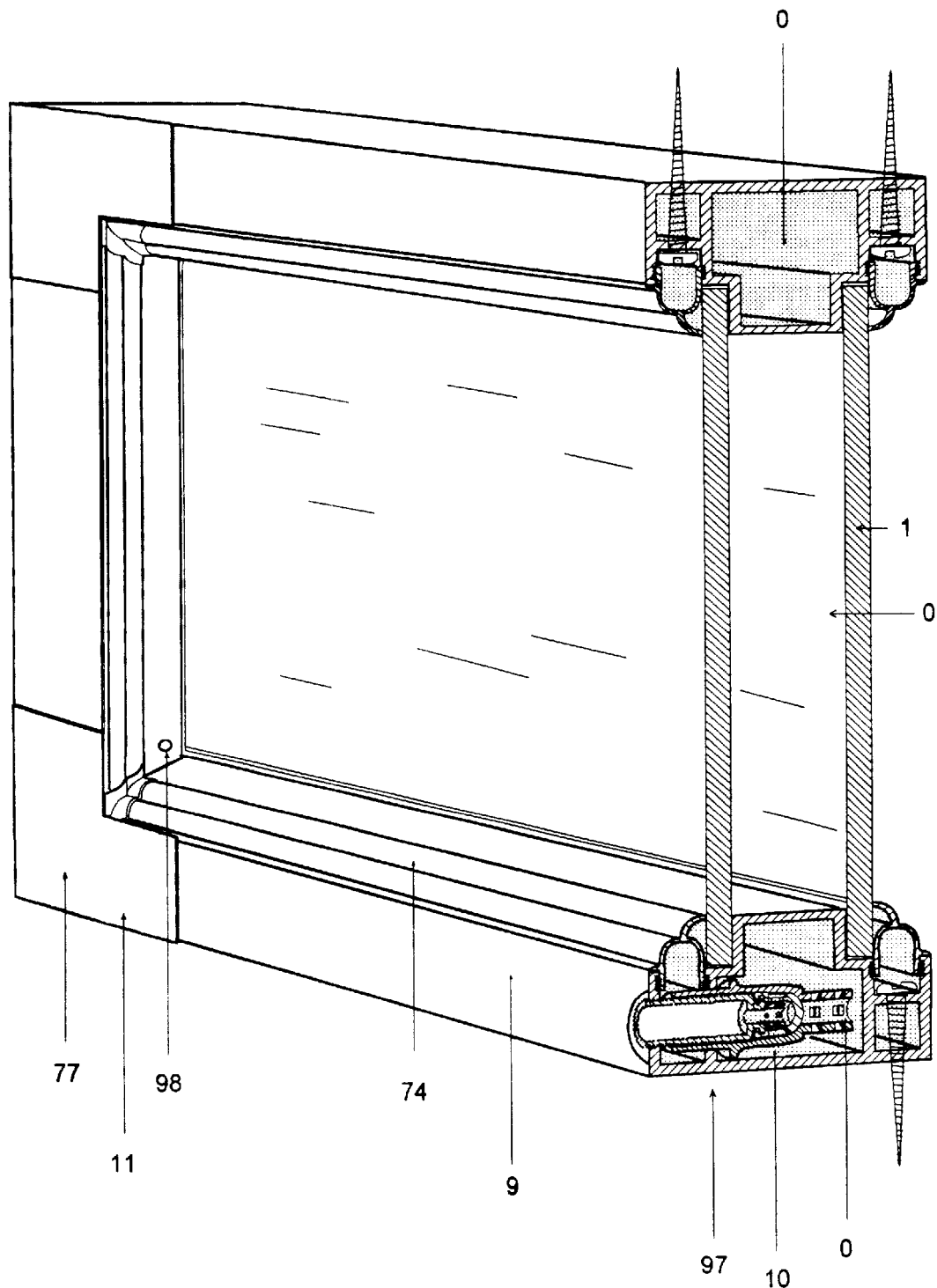
Figure 54:
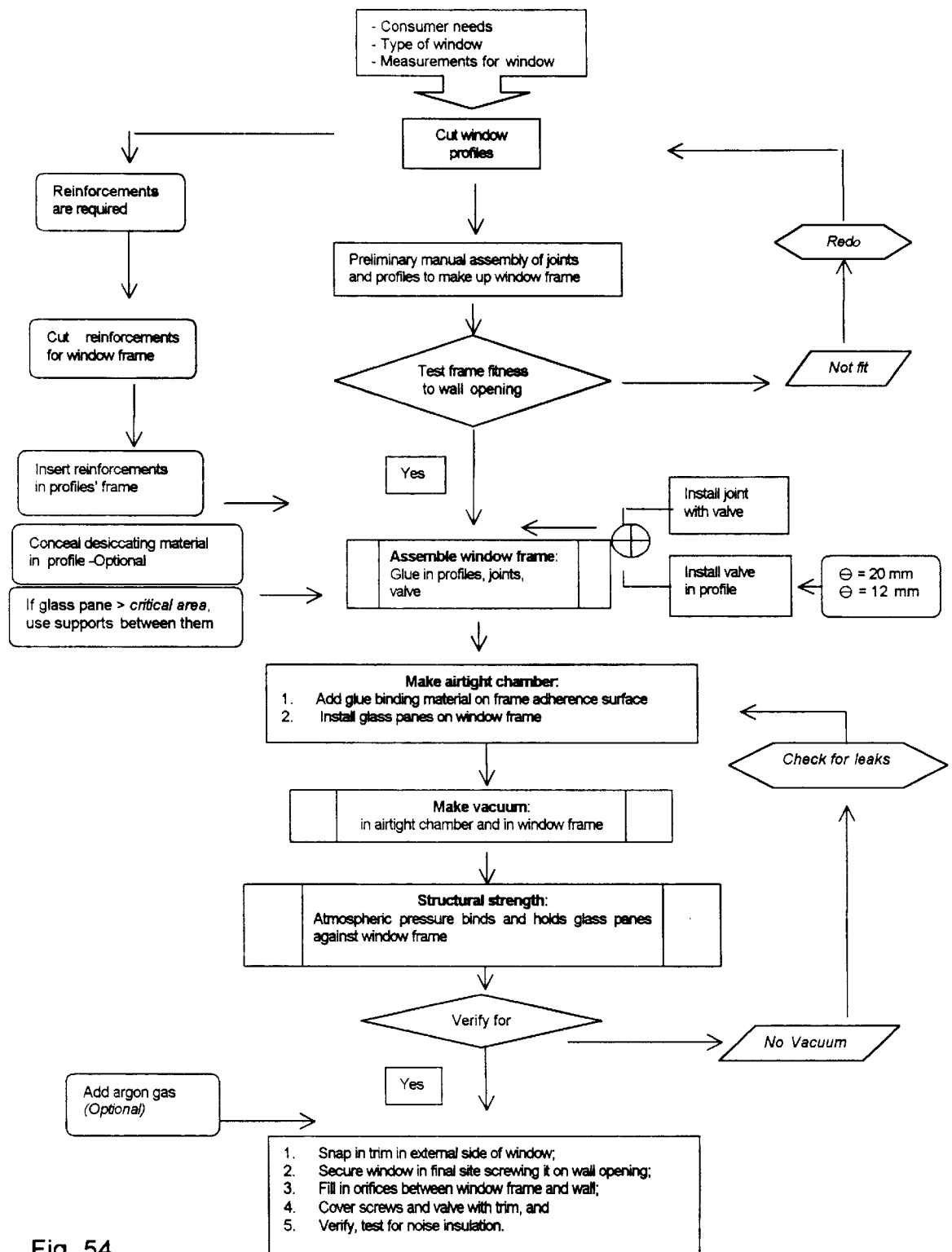

Trim and vacuum control valve:

FIG. 28 is a top view of window trim;

FIG. 29 is a cross-sectional view of the trim taken along line e–e' of FIG. 28;

FIG. 30 is a side view of the trim of FIG. 28;

FIG. 31 is a top view of a 45° trim cover;

FIG. 32 is a cross-sectional view of the 45° trim cover taken along line f–f of FIG. 31;

FIG. 33 is a top view of the exterior end of a fixed cylinder of a valve;

FIG. 34 is a cross-sectional view along the fixed cylinder of FIG. 33;

FIG. 35 is a top view of the internal end of the fixed cylinder of FIG. 33;

FIG. 36 is a top view of the external end of a rotary cylinder of a valve;

FIG. 37 is a cross-sectional view along the rotary cylinder of FIG. 36;

FIG. 38 is a top view of the internal end of the rotary cylinder of FIG. 36;

FIG. 39 is a top view of a valve seal hollow end;

FIG. 40 is a cross-sectional view of the valve seal of FIG. 39;

FIG. 41 is a top view of the convex end of the valve seal of FIG. 39;

FIG. 42 is an assembled valve in the open position;

FIG. 43 is an assembled valve in the closed position;

Position and location of vacuum control valve:

FIG. 44 is a cross-sectional view of the valve of FIG. 42 in horizontal position, in basic profile P1 of FIG. 1;

FIG. 45 is a side view of the valve of FIG. 42 in horizontal position, in basic profile P1 of FIG. 1;

FIG. 46 is a cross-sectional view of the valve of FIG. 42 in vertical position, in basic profile P1 of FIG. 1;

FIG. 47 is a side view of the valve of FIG. 42 in vertical position, in basic profile P1 of FIG. 1;

FIG. 48 is a cross-sectional view of the valve of FIG. 42 in horizontal position, in joint C1 of FIG. 4;

FIG. 49 is a side view of the valve of FIG. 42 in horizontal position in joint C1 of FIG. 4;

FIG. 50 is a cross-sectional view of the valve of FIG. 42 in vertical position, in joint C1 of FIG. 4;

FIG. 51 is a side view of the valve of FIG. 42 in vertical position, in joint C1 of FIG. 4;

Assembled window:

FIG. 52 is a perspective cross-sectional view of an assembled window;

FIG. 53 is an index and list of components used in the present invention;

FIG. 54 is a flow chart of the production and installation system of the present invention; and FIG. 55 is a summary of the main components and differences of prior technologies and the present invention.

It should be understood that the drawings are not necessarily to scale and that the embodiments are sometimes illustrated by graphic symbols, phantom lines, diagrammatic representations and fragmentary views. In certain instances, details that are not necessary for understanding the invention or which make other details difficult to perceive may have been omitted. It should be understood, of course, that the invention is not necessarily limited to the particular embodiments illustrated herein.

Like reference numerals will be used to refer to like parts throughout the Figures.

DETAILED DESCRIPTION OF THE INVENTION

The technology of this invention is new as compared to the one currently used in the construction of PVC and aluminum windows and requires special design and manufacturing of its components and for the assembly of the window. Among the objectives achieved by the invention are: (1) the use of the insulating potential of a vacuum, and (2) the sealing of the window frame joints without a machine. Meeting the first objective requires the creation of an airtight chamber and a valve to make a vacuum.

The design of profiles and joints to create an airtight chamber had to solve several critical details. First, it was necessary to provide an adherence surface (as) flat, even and uniform on the window frame, and to establish the height of the profile that contacts the glass pane, which has to be the minimum necessary in order to make profile production cost effective. Similarly, the distance of the pane separation (ps) had to be developed since the larger the separation, the greater the insulating capacity, but also the higher the cost, since the danger of a window collapsing by atmospheric pressure increases more than proportionally when a vacuum is made. The insulating capacity (IC) of the two pane window depends on the level of vacuum (1-ap) created inside the airtight chamber, on the separation distance of two glass panes (ps), and on the thickness (pt), type and quality ($k_i$) of the glass. The relationship among these factors can be written as:

$$IC = ps^b + (pt^c \times k_i)/(ap)^e$$

where:

ap is atmospheric pressure and has values from 0 to 1, b, c and e are constants that depend on each situation, $k_i$ is a constant that depends on the type and quality of glass.

However, the distance between glass panes and size of the adherence surface affect the cost of profiles and joints more than proportionally. For each increasing unit of ps, it would be necessary to increase the thickness of all the walls of profiles and joints to endure atmospheric pressure and avoid collapsing of the structure. The relationship of design and measurements with respect to these two factors and costs can be written as:

$$CIC = (P_1 \times ps^\beta) + (P_2 \times pt^\delta) + P_3 \times (ap)^{68}$$

where:

CIC is the cost of insulating capacity, $P_i$ are the respective prices and $P_3 \times (ap)$ is negligible, β, δ and ε have values depending on each situation, and the values of these corresponding parameters have the following condition:

b<β, d<δ and e<ε. A frame made with profiles and joints was tested for airtightness and structural strength against collapsing by atmospheric pressure. When the air in airtight chamber is evacuated, atmospheric pressure works on the whole structure in all directions, which has to be withstood by profiles, joints and glass panes. There is a critical area on the glass panes of the airtight chamber with a vacuum inside defined as the area beyond which the glass pane will not sustain atmospheric pressure and would shatter. For this reason, it is necessary to take into consideration the collapsing critical area of the glass panes in the design of the window. The extent of the this area depends on:

The level of vacuum inside the airtight chamber,

The area of the glass pane to the nearest support point on the frame,

The thickness (pt), type and quality of the glass ($k_i$);

The altitude of the window from sea level, and

The presence of quick, high and frequent changes in temperature.

Based on several tests with prototypes, it was found that, providing for safety margins, this critical area is about 60 centimeters from the nearest support point on the frame for regular glass panes of 4 millimeters thickness at altitudes from 0 to 2,600 meters above sea level. The frame structure made of profiles and joints can also collapse by atmospheric pressure, which is prevented by design, thickness of the walls and quality of the raw material and manufacturing. Glass pane collapsing can be prevented by inserting inside the airtight chamber a supporting device between and in contact with the panes at distances of about 60 centimeters. These supports can be of two types: decorative such as the colonial grills currently used by window manufacturers, or dissimulated such as a large variety of small cylinders made of clear plastic material glued to the internal surface of the panes up to vertical strips assembled together.

The second objective of assembling profiles without the use of a machine was achieved by using specially designed profiles and joints that can be manually snapped together and a binding material to make an airtight seal between the profiles and joints.

Commercial production starts with final design of profiles and joints and the associated specifications for the tooling of molds or matrices to extrude the profiles and injection mold the joints and the valve. In addition to the steps common to current thermoacoustic window building techniques, such as measurement and cutting of profiles, this system has several specific procedures for the assembly and installation of the window:

Preliminary manual assembly of the frame to test its fit in a wall opening,

Valve installation in a joint or in a profile,

Adding binding glue to joints for the final assembly of the frame.

Optionally, structural reinforcements can be used if required, and desiccating material can be concealed inside the profile.

Once binding glue is put in the adherence surface and the glass panes are in place, a vacuum is created in the structure.

If the vacuum works properly and stays, the window is secured on the wall opening using screws.

Referring now to FIG. 54, the production and installation system of the present invention is shown in more detail. As a first step, the user of the production and installation system of the present invention determines the needs of the consumer, such as the type of window desired and the basic measurements for the window to be installed. Hollow window profiles are then cut to a specific size based on the consumer needs. The profiles are then manually assembled using hollow joints to make up a first preliminary window frame. The first preliminary window frame is then placed in the wall opening to determine whether a proper fit exists between the frame and the wall opening. If the window frame does not fit properly in the wall opening, the profiles are recut to fit the wall opening or until they fit the wall opening.

When a proper fit is obtained between the window frame and the wall opening, the window frame is disassembled and then reassembled using a glue between the window profile sections and the joints. The hollow window frame includes at least one valve that is in communication with the hollow section of the assembled window frame. The valve may be provided as an integral part of a profile section or joint, or alternatively, the valve may be installed in a joint or profile section of the window frame before the frame has been assembled. An adhesive is then applied on inward facing surfaces of the assembled window frame and a pair of glass panes are installed in the frame in a substantially parallel spaced relationship. The hollow window frame includes at least one hole that is placed in communication with the airtight chamber that is formed between the two glass panes. The air remaining in the hollow window frame and the airtight chamber between the two glass panes is then removed by way of the valve and any suitable air extraction apparatus. The valve is then closed to maintain an airtight seal.

In other versions of the invention, (1) a desiccating material may be added in the window frame, (2) reinforcing material may be added to the window frame before final gluing of the frame, (3) supports may be installed between the glass panes, and (4) argon gas may be pumped into the hollow window frame and the airtight chamber between the two glass panes. The assembly process can be completed by: (1) snapping in trim on the external side of the window; (2) securing the window in the final site by screwing it on the wall opening; (3) filling in orifices between the wall and the window frame; (4) covering the screws and the valve with trim; and (5) testing for noise insulation.

In conclusion, we can say that the most advanced building system of thermoacoustic windows currently used all over the world is based on the union by fusion welding of PVC profiles to make the window frame. Profiles are designed to accommodate an airtight chamber made of two glass panes, which is built separately and then secured in the frame using gaskets but it is not hermetically sealed to the frame. The new construction technique creates airtight sealing in the frame joints, makes a fusion welding machine unnecessary, forms an airtight chamber within the glass panes on the window frame, which in turn makes it possible to take out the air inside this structure, at will and at any moment. By making a vacuum, atmospheric pressure presses together the glass panes against the frame, which improves the structural strength since the glass panes and the frame form a structural unit. Additionally, the glass pane weight is distributed to all sides of the frame and does not rest entirely on its bottom side, as happens with current technology. Schematically, the main components and differences of prior techniques and the method of the present invention are shown in FIG. 55.

In summary, the system has several discoveries that are solutions to several technical and cost problems of current technology to assemble thermoacoustic windows.

First, the assembly of components that form the frame does not require a fusion welding machine but are manually snapped together.

Second, this assembly renders an airtight seal and forms an adherence surface that allows binding the glass panes directly onto the frame forming an airtight chamber.

Third, this in turn makes possible to use a permanently installed vacuum control valve that, connected to an air extractor, can make vacuum at will in the airtight chamber and in the hollow frame.

Fourth, this in turn has several advantages:

1. Atmospheric pressure acts upon the frame components improving its binding and adheres the gluing material firmly to the glass panes and to the frame;
2. The frame and the glass panes form one structure that distributes the strain all over the frame and not only on the bottom horizontal profile as happens with current technology;
3. The vacuum created in the airtight chamber and in the frame increases the insulating capacity of the window;
4. The vacuum inside the airtight chamber can be of different levels, depending on the specific requirements, however, insulation is improved even with low levels of vacuum, which can be achieved with small capacity air extractors, and domestic vacuum cleaners;
5. The air extraction at will substantially reduces the humidity inside the airtight chamber. However, desiccating material can be concealed within the frame, improving appearance and reducing cost, as the desiccating material will not be seen around the binding material of the airtight chamber, as in currently produced windows;
6. The valve can also be used to extract air and to insert an inert gas or any other gas-like material, at assembly or after installation, at any time. This allows a user to make vacuum in one season and inflow an inert gas in the other; to make vacuum if the main purpose is to insulate from noise or insufflate a gas if the main purpose is for thermal insulation (i.e., argon gas has lower thermal conductivity than air);
7. Since the window is formed by binding glass panes directly on the frame, there are no orifices between the airtight chamber and the frame, and rubber-like sealants are not required. The elimination of air-filled spaces and seals improves insulating capacity and reduces window vibration, as well as costs;
8. The use of a support device between the glass panes, like colonial grilles, allows a user to use the system for any practical window size;

Additionally,

9. The system can be used with any type of glass and thickness;
10. The manual assembly by snapping on profiles and joints allows a user to assemble the window at the final site, reducing the differences in measurements between the window and the wall opening;
11. Final users can buy assembled windows ready to install, or separate components for do-it-yourself assembly;
12. The system allows a user to insert reinforcements into the profile, maintaining the airtight condition;
13. The system can be used for any type of double glass pane window and for any other purpose where snapping on of parts is possible, i.e. replacing assembly systems based on fusion welding, whether or not an airtight chamber is built or whether or not the panes are transparent. Examples include transparent roofs (patio porches, green houses), partitions, ceilings and the like.
14. The snap on assembly of profiles and joints can be used for one glass pane window and for other similar uses; and
15. If air leaking is detected, i.e. the airtight chamber does not keep up the vacuum, the leaking point or points can be detected by pumping in a colored gas. The leaking orifice can be fixed on the spot without disassembling the window by adding a glue-binding material while making a vacuum, that is, atmospheric pressure will push in the glue-binding material in the orifice while the air extractor suctions, thereby clogging the orifice with glue-binding material.

As used throughout the specification and claims, the following terms have the meanings given below:

Acoustic insulating capacity: Capacity to insulate houses and buildings from day to day annoying noise composed of different wave length and intensities, audible by human ear and measured by standard methods and devices.

Air extractor: A device such as a household vacuum cleaner, which connected by a flexible tube to the vacuum control valve, allows a user to remove air from the airtight chamber. Usually, such a device can also pump air in.

Airtight chamber: A chamber in a house or building window so built that it does not allow air to enter for a reasonable time span, while the structural adjusting effects are accomplished, and in which different levels of vacuum can be made at will, several times during the windows life span.

Binding material: A gluing material with properties to bind glass panes and a frame for a reasonable time span, strong and flexible enough to sustain temperature variations and expansion differences between glass and plastic. These binding materials are found currently in the market in a large variety of types and qualities.

Improvement of Thermal and Acoustic Insulating Capacity: Any higher or better thermal or noise insulation achieved by the windows constructed with the vacuum, and the snap-on system described herein, measured with commonly used devices and standards.

Precision male joint: Any structure made of a plastic material like PVC or vinyl, produced by injection molding or extrusion, having external walls and a protruding part with given dimensions that performs as a male joint that inserts in the female joint and having dimensions allowing the use of a glue-binding material.

Profile: Any structure made of a plastic material like PVC or vinyl, produced by extrusion having external walls and a hollow space with given dimensions that performs as a female joint.

Sealant, sealant material: Any material with the property to substantially obstruct the passage of air from the outside to the inside of a hollow space within the frame and in the airtight chamber as formerly defined.

Support device between the glass panes: Any physical support placed in any way between two glass panes that make them able to withstand atmospheric pressure. These devices, such as colonial grills, are currently used in the industry or can be easily adapted.

Thermal insulating capacity: Capacity to insulate houses and buildings from day to day temperatures in different seasons, with the understanding that a vacuum does not insulate from radiant heat.

Vacuum: Any pressure lower than atmospheric pressure at the site where the window is assembled and installed.

A. General Description of the Invention

An assembly system for thermoacoustic windows in accordance with the present invention comprises a set of profiles and precision joints manufactured with spacing for a sealing material, and a vacuum control valve. The accompanying drawings depict a basic model for a casement window to be directly screwed to the wall opening, though they are suitable to be used along with a frame installed previously on the wall opening to receive the window frame proper. Profiles and joints can be designed for any type of window: awning, bay, casement, double hang sashes, picture, slider, for partitions and for a one glass pane window. These drawings have the purpose to show the basic idea of the system, the components that make up the window and how they fit together. Since they are designed to be snapped one into the other, their main features and functions coincide and repeat. To make it easier to follow the identification of the features of each drawing, the following numbering system was used:

1. The hollow part of a profile, equivalent to a female joint, is identified by two digits, the last one being zero 0;
2. The male joint is identified by two digits, the last one being one 1, in such a way that the female joint 10 matches the male joint 11, the 20 the 21, etc;
3. Except for the first one, the components have been identified by two digits in groups of ten, in such a way that the feature and function 3 corresponds to 13, 23, 33, . . . 4 to 14, 24, 34, etc.

B. Preferred Embodiments. Two glass Panes or Thermoacoustic Window

1. Basic profile—P1

FIG. 1 depicts a top view of a basic profile, with a glass panes separation distance 3, spaces for the glass pane 4, hole 5 for screws, and a support 6 for trim (shown in FIG. 28).

FIG. 2 depicts a cross-sectional view of the basic profile with its hollow space 10, where the male joint 11 of the joint shown in FIG. 4 inserts, the separation distance between panes 3, the space for the glass pane 4, the hole for the screws 5, the support and grooves for the trim 6, an adherence surface 7 of the window frame for contacting the pane and a protruding edge 7a retain the sealing material, a chamber 8 for the screws that secure the window to the wall opening, and a line 9 where the body of the profile initiates.

FIG. 3 depicts a side view of the basic profile with the line of the separation distance of the panes 3, the adherence surface 7 of the frame with the pane, the profile's body 9 and the line that initiates the hollow space 10 where the male joint 11 inserts.

The size of this profile is variable according to the needs of the final user and of the market. However, the basic profile can measure 20 millimeters high in the body 9, a total of 17.5 millimeters in the three features: support for the trim 6, the hole for the screw that secures the window to the wall opening 5, and the space for the glass pane 6; 10 millimeters high of the adherence surface 7, and 20 to 30 millimeters separation distance 3 which makes the base of the profile 55 to 65 millimeters. The profile is manufactured of a plastic material like PVC as well as the precision joint and with a spacing distance for a sealing to hermetically bind these unions and a sealant to adhere hermetically two glass panes to the frame. Suitable products are currently found in the market in a large variety and are known to those skilled in the art.

2. Visible Male 90° Joint—C1 for Basic Profile

The system of the present invention has a precision 90° male joint, to assemble two sections of the basic profile, that inserts in the hollow space 10 of the basic profile described in FIG. 2. The joint can be visible or not visible; the visible joint assembles the frame with a straight cut and conceals possible cutting defects improving the appearance; and the non-visible joint requires a cut at a 45° angle and does not conceal possible cutting defects.

FIG. 4 depicts a top view of a 90° male joint for the basic profile, with the two male joints 11 that insert in the hollow space 10 of the basic profile described in FIG. 2. Also shown are the external wall that conceals the straight cut of profile 12, support and grooves 16 for the trim, adherence surface 17 of the joint for the pane with the protruding guide to retain the sealing material, and the line 19 of the body of profile.

FIG. 5 depicts a side view of the visible 90° male joint for the basic profile, with the two male joints 11 that insert in the hollow spaces 10 of the basic profile described in FIG. 2, the line of the external wall that conceals the straight cut of profile 12; the support and grooves 16 for the trim in dashed lines, the adherence surface 17 of the joint for the pane with the protruding guide to retain the sealing material and the body 19 of profile.

FIG. 6 depicts a side rear view of the visible 90° male joint 11 for the basic profile that inserts in the hollow space 10 of profile described in FIG. 2. It also depicts the posterior of the external wall 12 that conceals the straight cut of profile. This Figure depicts in dashed lines the other components of the 90° male joint described in FIG. 4.

3. Double Profile—P2

Casement window assembly usually requires a second body, which makes it necessary to have a double profile to hold the contiguous glass panes. A double profile is designed for that purpose.

Figure 7:
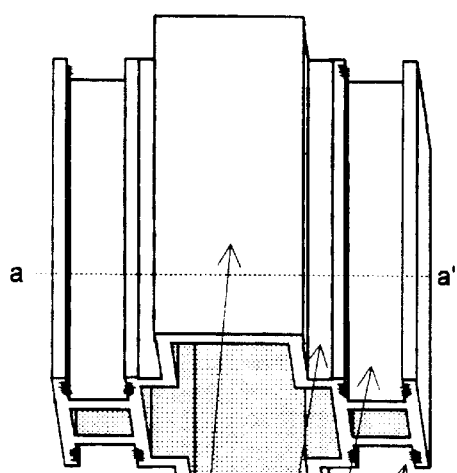
FIG. 7 is a top view of a double profile (P2)

FIG. 7 depicts a top view of the double profile with a glass panes separation distance 23, a space 24 for the glass pane, a hole 25 for screws that secure the window to the wall opening, and a support 26 for the trim.

Figure 8:
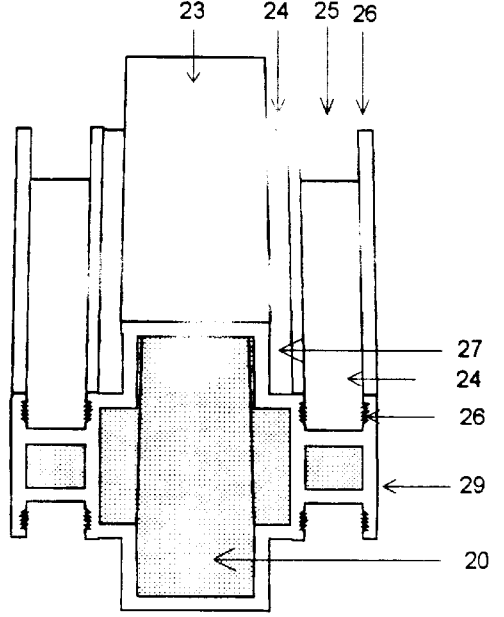
FIG. 8 is a cross-sectional view of double profile P2 taken along line b–b' of FIG. 7.

FIG. 8 depicts a cross-sectional view of the double profile with hollow space 20 where the male joint 21 of the Tee inserts, which will be described in FIG. 10, the separation distance between panes 23, the four spaces for the glass panes 24, the support 26 for the trim, the four adherence surfaces 27 of the frame to the glass panes, with the protruding guide to retain the sealing material, and the line 29 of the profile's body.

Figure 9:
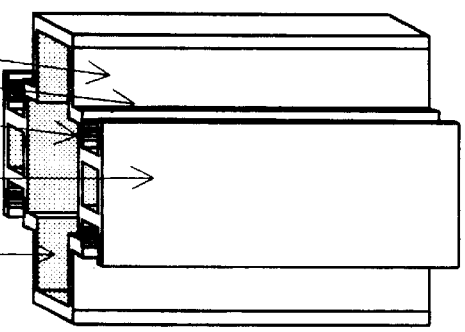
FIG. 9 is a side view of double profile P2 of FIG. 7.

FIG. 9 depicts a side view of the double profile with the line of the panes' separation distance 23, the support and the grooves 26 for the trim in dashed lines, the adherence surfaces 27 of the frame with the glass panes, and the profile's body 29.

The size and measures of this double profile coincide with the ones of the basic profile and is manufactured with the same material and specifications.

4. Visible 90° Tee Joint for Double Profile—T2

This precision male joint assembles the double profile with the basic. As in the other joints, this one can be visible or not visible.

FIG. 10 depicts a top view of the 90° Tee with the two male joints T11 that insert in the hollow space 10 of the basic profile described in FIG. 2. It also depicts the external wall 32 that conceals the straight cut of profile, the support and grooves 36 for the trim, adherence surface 37 of the joint to the glass pane, with the protruding guide to retain the sealing material, the line 39 of the body of the joint, and the male joint 21 that inserts in the hollow space 20 of the double profile described in FIG. 8.

FIG. 11 depicts a side view of the 90° Tee with the two male joints T11 that insert in the hollow space 10 of the basic profile described in FIG. 2. It also depicts the external wall 32 that conceals the straight cut of profile, the support and grooves 36 for the trim, the adherence surfaces 37 of the joint to the glass panes, with the protruding guide to retain the sealing material, the body of the joint 39, and the male joint 21 that inserts in the hollow space 20 of the double profile described in FIG. 8.

FIG. 12 depicts another side view of the 90° Tee with one of the male joints T11 that inserts in the hollow space 10 of the basic profile described in FIG. 2. It depicts also the external wall 32 that conceals the straight cut of profile, the support and grooves 36 for the trim, the adherence surfaces 37 of the Tee to the glass panes, with the protruding guide to retain the sealing material, the line 39 of the body's joint, and the male joint 21 that inserts in the hollow space 20 of the double profile described in FIG. 8.

5. Not Visible 90° Joint—C2

This joint is a simplified version of the visible joint described in FIGS. 4 and 5.

Figures 13, 14:
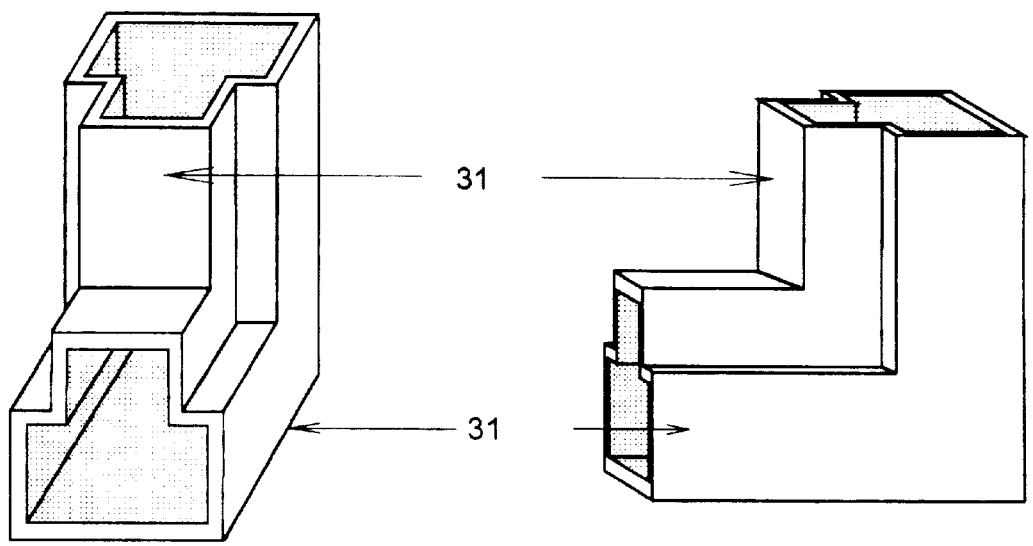
FIG. 13 is a top view of a 90° joint (C4) that is not visible when the invention is assembled.
FIG. 14 is a side view of the 90° joint C4 shown in FIG. 13.

FIG. 13 depicts a top view of the not visible 90° joint for the basic profile with the male joint 31 that inserts in the hollow space 10 of the basic profile described in FIG. 2. Since this joint is symmetrical, the figure also depicts the vertical view of the joint 31 that inserts in the hollow space 10 of the basic profile described in FIG. 2.

FIG. 14 depicts a side view of the not visible 90° joint for the basic profile, with the lateral view of the two male joints 31 that insert in the hollow space 10 of FIG. 2.

6. Not Visible 90° Tee Joint—T3

Figures 15, 16:
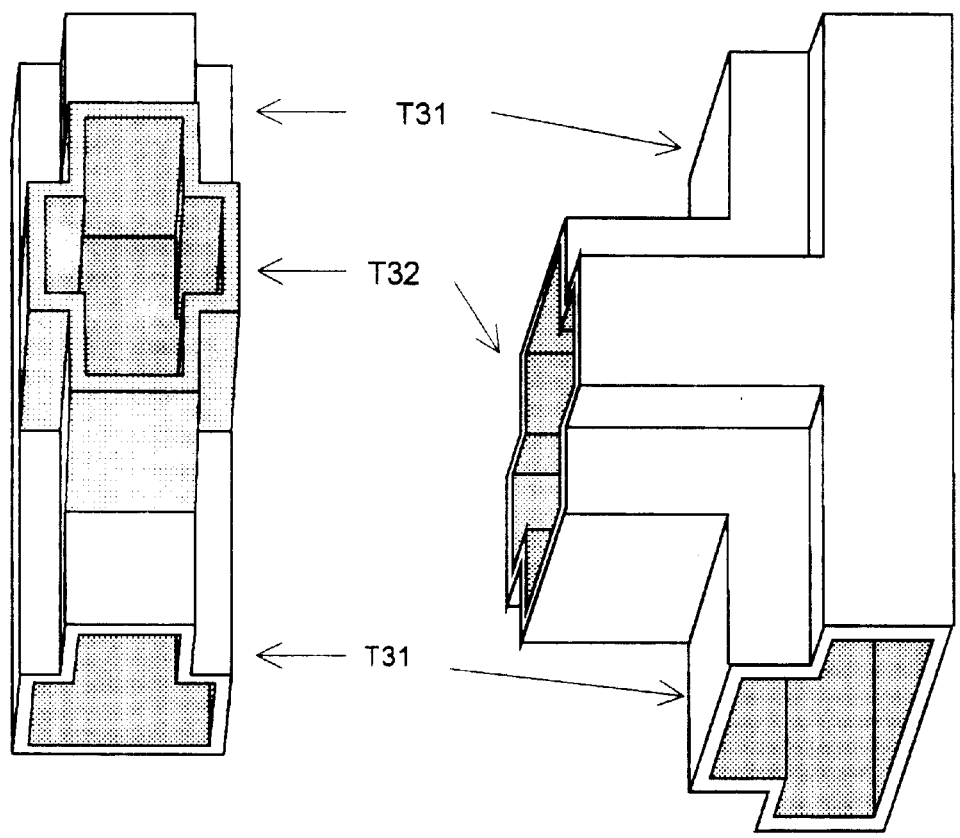
FIG. 15 is a top view of a 90° Tee (T3) that is not visible when the invention is assembled.
FIG. 16 is a side view of 90° Tee T3 of FIG. 15.

FIG. 15 depicts a top view of the not visible 90° Tee with the two male joints T31 that insert in the hollow space 10 of the basic profile described in FIG. 2. It also depicts the male joint 32 that inserts in the hollow space 20 of the double profile described in FIG. 8.

FIG. 16 depicts a side view of the 90° Tee with the two male joints T31 that insert in the hollow space 10 of the basic profile described in FIG. 2 and of the male joint 32 that inserts in the hollow space 20 of the double profile described in FIG. 8.

7. Window Door Basic Profile—P3

The hinged window door requires a double profile to hold at one side the glass panes and at the other to stop and seal the window door frame against the window frame.

FIG. 17 depicts a top view of the window door basic profile, with a stop 43 for the door, a space for the glass pane 44, and a support 46 for the trim.

FIG. 18 depicts a cross sectional view taken along line c–c' or vertical or front view of the window door basic profile, with the hollow space 40 where the male joint 41 inserts, which will be described in FIG. 20, the stop and contact with the window frame door 42 and the stop 43 for the door. It also depicts the space for the glass pane 44, the support and grooves for the trim 46, the adherence surface of the frame 47 with the protruding guide to retain the sealing material, and the line of the body of profile 49.

FIG. 19 depicts a side view of the window door basic profile with the line where the hollow space 40 initiates, the stop and contact with the window door 42, and the body 43 that supports the stop, the space for the glass pane 44, the support and grooves 46 for the trim in dashed lines, and the body of profile 49.

8. Visible 90° Tee Joint for Window and Door—T3

This joint assembles the profiles of the window with its door, that is, profile P1, profile P3 and profile P4. Like the other joints this can be visible or not visible.

Figure 24:
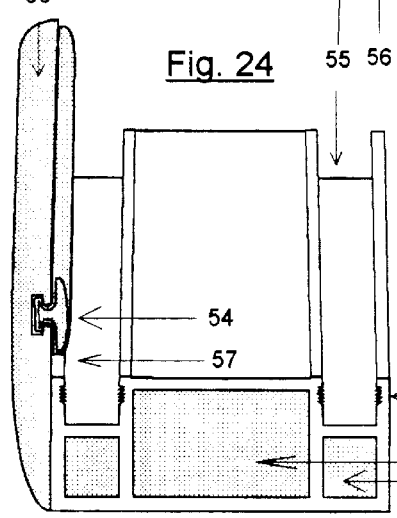
FIG. 24 is a cross-sectional view of the window door frame profile P4 taken along line d–d' of FIG. 23.

FIG. 20 depicts a top view of a visible 90° Tee for a window door, with the male joint T3-11 that inserts in the hollow space 10 of the basic profile P1 described in FIG. 2, the male joint T51 that inserts in the hollow space 50 of profile P4 described in FIG. 24, and the male joint 41 that inserts in the hollow space 40 of profile P3 described in FIG. 18. It also depicts the external wall 52 that conceals the straight cut of profile, the support and grooves 56 for the trim, the adherence surface 57 of the joint to the glass panes, with the protruding guide to retain the sealing material, and the line of the body's joint 59.

FIG. 21 depicts a side view of the visible 90° Tee for window door, with the male joint T3-11 that inserts in the hollow space 10 of the basic profile P1 described in FIG. 2, the male joint T51 that inserts in the hollow space 50 of profile P4 described in FIG. 24, and the male joint 41 that inserts in the hollow space 40 of profile P3 described in FIG. 18. It also depicts the external wall 52 that conceals the straight cut of profile, the support and grooves 56 for the trim in dashed lines, the adherence surface 57 of the joint to the glass panes, with the protruding guide to retain the sealing material, and the body's joint 59.

FIG. 22 depicts a front view of the visible 90° Tee for window door, with the male joint T51 that inserts in the hollow space 50 of profile P4 described in FIG. 24, and the male joint 41 that inserts in the hollow space 40 of profile P3. It also depicts the external wall 52 that conceals the straight cut of profile; the support and grooves for the trim 56 in dashed lines, and the line 59 of the body's joint.

9. Window Door Frame Profile—P4

The window door requires profiles to hold and stop the door when closed.

Figure 23:
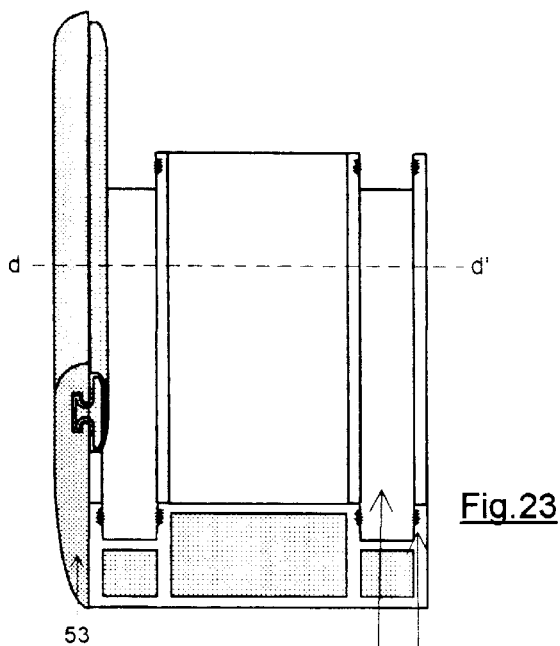
FIG. 23 is a top view of a window door frame profile (P4)

FIG. 23 depicts a top view of the window door frame profile with the line 53 of the stop of the door, the hole 55 for the screws and the support 56 for the trim.

Figures 26, 27:
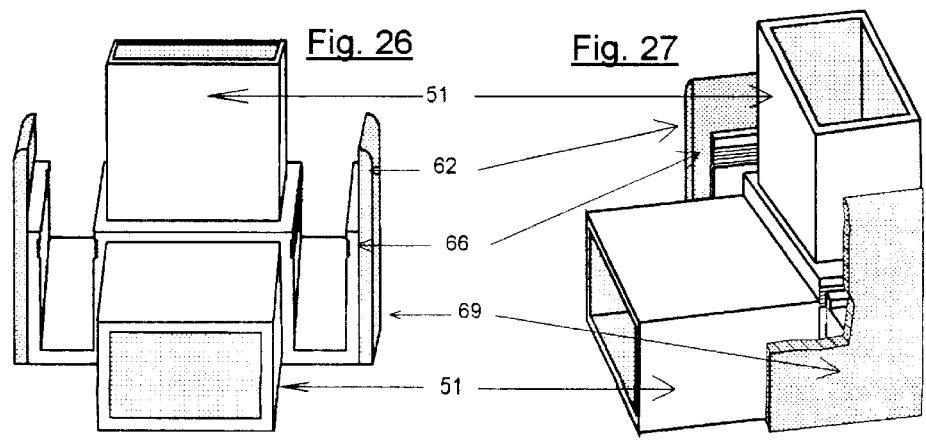
FIG. 26 is a top view of a visible male 90° joint (C4)
FIG. 27 is a side view of the visible male 90° joint C4 of FIG. 26.

FIG. 24 depicts a cross sectional view taken along line d–d' in FIG. 23, or vertical or front view of the window door frame profile, with the hollow space 50 where the male joint 51 inserts, which is described in FIG. 26, the stop and contact with the window door 53, the built in seal 54 for the door, the hole for the screws 55, the support and grooves for the trim 66, the chamber for the screws 58 that secure the window to the wall opening, and the line of the profile's body 59.

Figure 25:
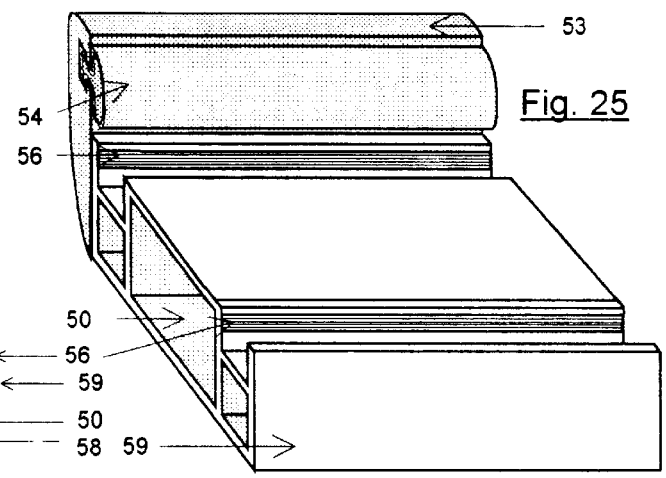
FIG. 25 is a side view of window door frame profile P4 of FIG. 23.

FIG. 25 depicts a side view of the window door profile, with the line 50 where the hollow space initiates and where the male joint 51 inserts, which is described in FIG. 26, the stop and contact 53 for the window door, the built in seal 54 for the door, the support for the trim 56 in dashed lines, and the profile's body 59.

10. Visible Male 90° Joint—C4

The system has a precision male 90° joint designed to unite two sections of the basic profile of the window door, that inserts in the hollow space 50 of the window door profile described in FIG. 24. This joint can be visible or not visible.

FIG. 26 depicts a horizontal or top view of the visible male 90° joint for the window door frame profile, with the male joint 51 that inserts in the hollow space 50 of profile described in FIG. 24; depicts the external wall 62 that conceals the straight cut of the profile, the support and grooves 66 for the trim, and the line 69 of the body's joint.

FIG. 27 depicts a side view of the visible male 90° joint for the window door frame profile, with the male joint 51 that inserts in the hollow space 50 of profile described in FIG. 24; depicts the external wall 62 that conceals the straight cut of profile, the support and grooves 66, in dashed lines, for the trim, and the line 69 of the body's joint.

11. Trim

A trim is used to cover the screws that secure the window to the wall opening, the adherence surface which will have a sealant material and the valve when installed in the vertical position (as shown in FIGS. 46 and 48). The trim has no mechanical function of holding the glass to the frame, it is made by extrusion and snapped into the profile.

FIG. 28 depicts a top view of the trim with the point of contact 74 with the glass that transmits the pressure to the support on the frame or on the joint. The trim has an arm 75 and legs 76 with grooves to hold by pressure. The arm 75 and legs 76 serve as mounting flanges.

FIG. 29 depicts a cross sectional view taken along line e–e' on FIG. 28 of the trim with the point of contact 74 with the glass, the arm 75 of the trim and the legs 76, with grooves to hold by pressure.

FIG. 30 depicts a side view of the trim with the point of contact 74 with the glass, the arm 75 of the trim and the legs 76, with grooves to hold by pressure.

The trim can be cut at 45° for its union in corners or in straight cut; in which case a trim cover is used to conceal cutting imperfections.

FIG. 31 depicts a top view of the 45° trim cover with the surface 77 that covers the cutting of the trim.

FIG. 32 depicts a cross sectional view taken along line f–f' on FIG. 31 of the 45° trim cover with the surface 77 that covers the cutting of the trim.

12. Vacuum Control Valve (a) Functions of the Vacuum Control Valve

The vacuum control valve is an essential part in the system and its function is to control the air flow to and from the hermetic chamber and the frame's hollow spaces. The valve is made of PVC or a similar plastic material and is installed permanently in the window to be used at any time. The valve can be manufactured as part of the joint or separately to be bonded in its final position in the joint or in the profile, in this latter event when assembling the window.

(b) Characteristics of the Valve

The vacuum control valve has three parts:

(1) a fixed cylinder with a hole along it, a concave part inside, screwing threads in the internal wall, and both ends opened, (2) a rotary cylinder with a hole along it, screwing threads in its external surface and with both ends open, one of which is designed to hold a seal, and (3) a seal screwed to the rotary cylinder that seats in the concave part of the fixed cylinder.

FIG. 33 depicts a top view of the external end of fixed cylinder with the line of the external and the fin 82 to glue it to the internal side of the joint wall or of the profile wall and the hollow space 80 where the rotary cylinder is screwed in.

FIG. 34 depicts a cross sectional view along the fixed cylinder, with the line of the external surface and the fin 82, the hollow space 80 where the rotary cylinder is screwed, with the threads up to half of the internal surface and the concave surface 83 where the seal seats, which will be described in FIG. 40, the orifice for air flow 84, and the external wall 85 with serrated surface to receive a general purpose filtering material, not described in this patent, to retain the particles produced when cutting profiles, particles that can clog the orifices of the valve. This end has also orifices at its sides 86 to improve air flow.

FIG. 35 depicts a top view of the internal end of the fixed cylinder with the orifice 84 for air flow, and the line of the external surface and fin 82 to bind the cylinder to a profile or joint.

FIG. 36 depicts a top view of the external end of rotary cylinder with the external wall 87 and the external orifice 88 for air flow.

FIG. 37 depicts a cross sectional view along the rotary cylinder with the external wall 87 that has two sections, one with serrated surface 87A to hold a flexible hose that connects the valve with an air extractor and the other one threaded 87B to screw the rotary cylinder in the fixed cylinder, the external orifice 88, and the internal one 81 that inserts in the orifice 80 of the fixed cylinder, with the external surface with threads to screw in the seal, which will be described in FIG. 40, orifices around it 89 for air flow, and the ring 91 to hold in place the second seal, which is described in FIG. 40.

FIG. 38 is a top view of the internal end of rotary cylinder with the line of the external surface 87 and the orifice for air flow 81.

FIG. 39 depicts a top view of the seal hollow end with the orifice for air flow 90 and the line of the securing part 92 of the seal to the rotary cylinder.

FIG. 40 depicts a cross sectional view along the seal, with the air flow orifice 90, the second seal 92 that receives the ring 91 of the rotary cylinder, the orifices 93 for air flow, the convex body 94 that seats on the concave portion of the fixed cylinder, the internal threaded surface 96 to screw the seal into the rotary cylinder.

FIG. 41 is a top view of the seal convex end with the convex surface 94 and the line of the second seal 92.

FIG. 42 depicts the valve assembled in closed position in cross section along the cylinders. The rotary cylinder is screwed in the fixed cylinder which makes the seal to seat on the concave portion of the fixed cylinder and closes the air passages, while when the rotary cylinder is unscrewed it creates a space where air can flow in both directions. The seal is made of a strong but flexible material since it is intended to seat against the concave portion of the fixed cylinder and closes tightly mainly because of the atmospheric pressure on the seal, which deforms it to adjust exactly to the receiving concave surface. The closed position is achieved at will; when the desired level of vacuum inside the chamber is reached, the rotary cylinder is screwed in to this position and the air extractor set to off. The strong and flexible material of the seal is commercially available and known to those skilled in the art.

Since the volume of air inside the window vacuum tight chamber is small, the capacity of the negative pump or air extractor may be small and may operate for only a couple of minutes, depending on the level of vacuum desired. Very high levels of vacuum will require more capacity and more time, however, for practical purposes, a small capacity will suffice. When the air is pumped out from the window chamber, the external part of the seal 96 acts as a second seal that, mainly by atmospheric pressure, prevents the air to enter into this inner portion of the valve making this operation more efficient.

FIG. 43 depicts the valve assembled in open position in cross section along the cylinders.

(c) Valve Location and Position

The valve can be factory assembled in one of the joints ready to be installed. In this case, the fixed cylinder is manufactured as part of the joint and the rotary cylinder and the seal are manufactured separately and then put together in the joint. The three components can be also manufactured separately and put together to be installed and bonded in one joint or in profile. In both cases, the valve can have several positions.

FIG. 44 depicts a cross sectional view of the valve in horizontal position in the basic profile P1

FIG. 45 depicts a side view of the valve in horizontal position in basic profile P1 of FIG. 1.

FIG. 46 depicts a cross sectional view the valve in vertical position in basic profile P1 of FIG. 1.

FIG. 47 depicts a side view of the valve in vertical position in basic profile P1.

FIG. 48 depicts a cross sectional view of the valve in horizontal position in joint C1

FIG. 49 depicts a side view of the valve in horizontal position in joint C1.

FIG. 50 depicts a cross sectional view the valve in vertical position in joint C1.

FIG. 51 depicts a side view of the valve in vertical position in joint C1.

C. Assembly of Components

FIG. 52 depicts a perspective, partial cross sectional view of an assembled window with the profile's body 9, the hollow space 10 of the basic profile where the male joint 11 inserts, the trim 74 and the trim cover 77, the cover of the valve 97, a hole 98 that places the hollow space of the profile in communication with the airtight chamber between the glass panes 1. It also shows one of the possible positions of the valve and of the screws that secure the window to the wall opening.

FIG. 53 depicts the list and position of main components for a casement type window.

Although the invention has been described in considerable detail with reference to certain preferred embodiments, one skilled in the art will appreciate that the present invention can be practiced by other than the preferred embodiments, which have been presented for the purpose of illustration and not of limitation. Therefore, the spirit and scope of the appended claims should not be limited to the description of the preferred embodiments illustrated herein.

What is claimed is:

1. A building partition comprising:

a hollow airtight frame defining an airtight chamber; said frame having first and second outwardly facing adherence surfaces located substantially all along a perimeter of said frame; and a valve installed in the hollow frame, the valve providing a fluid communication path from outside the hollow frame to the airtight chamber, the valve being adjustable from a closed position where no fluid may pass from outside the hollow frame to the airtight chamber to an open position where fluid may pass from outside the hollow frame to the airtight chamber, at least one hole in the inner surface providing a fluid communication path between the airtight space and the airtight chamber, whereby fluid may pass from outside the hollow frame through the valve through the airtight chamber and into the airtight space when the valve is in the open position, a first panel secured to the first adherence surface of the frame, the first panel having an outer edge dimensioned so that the outer edge of the first panel fits closely to the said first adherence surface of the frame, a second panel secured to the second adherence surface of the frame, the second panel having an outer edge dimensioned so that the outer edge of the second panel fits closely to the said second adherence surface of the frame, the first panel and the second panel being arranged in substantially parallel spaced relationship, whereby the first panel and the second panel are secured to the adherence surfaces of the frame such that an airtight space is formed between the first panel, the second panel and the inner surface of the frame, a plurality of hollow joints having end portions; and a plurality of hollow profiles having end sections, the end portions of the hollow joints being dimensioned to snugly fit within the end sections of the hollow profiles such that the hollow joints and the hollow profiles may be assembled to form the hollow frame.

2. The building partition of claim 1 wherein:

the first panel and the second panel are glass panes.

3. The building partition of claim 1 wherein:

the hollow joints and the hollow profiles are dimensioned such that an adhesive may be applied to surfaces of the hollow joints and to corresponding surfaces of the hollow profiles that mate when the hollow joints and hollow profiles are assembled, forming an airtight union.

4. The building partition of claim 3 wherein the valve comprises:

a tubular fixed cylinder having an internal surface with threads and a concave seat;

a rotary cylinder having an external surface with threads engaging the threads on the internal surface of the fixed cylinder and having at least one orifice extending through a wall of an internal end portion of the rotary cylinder; and a seal with a convex surface fastened on the internal end portion of the rotary cylinder, whereby the valve is placed in the closed position by screwing the rotary cylinder such that the convex surface of the seal seats on the concave part of the fixed cylinder.

5. The building partition of claim 3 further comprising:

at least one trim section having mounting flanges, the inner surface of the frame having a groove dimensioned to receive the mounting flanges and secure each of the trim sections to the inner surface of the frame.

6. An insulating window comprising:

a hollow airtight frame defining an airtight chamber, said frame having first and second outwardly facing adherence surfaces located substantially all along a perimeter of said frame;

a valve installed in the hollow frame, the valve providing a fluid communication path from outside the hollow frame to the airtight chamber and through a hole in the inner surface to the airtight space, the valve being adjustable from a closed position where no fluid may pass from outside the hollow frame to the airtight chamber to an open position where fluid may pass from outside the hollow frame to the airtight chamber;

a first glass pane secured to the first adherence surface of the frame, the first glass pane having an outer edge dimensioned so that the outer edge of the first glass pane fits closely to the first adherence surface of the frame; and a second glass pane secured to the second adherence surface of the frame, the second glass pane having an outer edge dimensioned so that the outer edge of the second glass pane fits closely to the second adherence surface of the frame, wherein the first glass pane and the second glass pane are arranged in substantially parallel spaced relationship, the first glass pane and the second glass pane being secured to the adherence surfaces of the frame such that an airtight space is formed between the first glass pane, the second glass pane and the inner surface of the frame, the frame including a hole providing a fluid communication path between the airtight space and the airtight chamber, whereby fluid may pass from outside the hollow frame through the valve through the airtight chamber and into the airtight space when the valve is in the open position, a plurality of hollow joints having end portions; and a plurality of hollow profiles having end portions the end portions of the hollow joints being dimensioned to snugly fit within the end sections of the hollow profiles such that the hollow joints and the hollow profiles may be assembled to form a hollow frame.

7. The insulating window of claim 6 wherein:

the hollow joints and hollow profiles are dimensioned such that an adhesive may be applied to the surfaces of the hollow joints and to corresponding surfaces of the hollow profiles that mate when the hollow joints and hollow profiles are assembled.

8. The insulating window of claim 7 wherein the valve comprises:

a tubular fixed cylinder having an internal surface with threads and a concave seat;

a rotary cylinder having an external surface with threads engaging the threads on the internal surface of the fixed cylinder and having at least one orifice extending through a wall of an internal end portion of the rotary cylinder; and a seal with a convex surface fastened on the internal end portion of the rotary cylinder, whereby the valve is placed in the closed position by screwing the rotary cylinder such that the convex surface of the seal seats on the concave part of the fixed cylinder.

9. The insulating window of claim 7 further comprising:

at least one trim section having mounting flanges, the inner surface of the frame having a groove dimensioned to receive the mounting flanges and secure each of the trim sections to the inner surface of the frame.

10. The insulating window of claim 7 wherein:

a desiccating material is disposed in the airtight chamber.

11. The insulating window of claim 7 wherein:

reinforcing members are disposed in the airtight chamber.

12. The insulating window of claim 7 wherein:

supports are installed between the first glass pane and the second glass pane.

\* \* \* \* \*